United States Patent [19]

Stead et al.

[11] Patent Number: 4,865,990
[45] Date of Patent: Sep. 12, 1989

[54] PROTEIN ADSORBENT INCLUDING A COLORED COMPOUND CONTAINING A QUATERNARY AMMONIUM ESPECIALLY AMIDINIUM OR GUANIDIMIUM CATIONIC GROUP AND A CELLULOSE REACTIVE GROUP

[75] Inventors: Cecil V. Stead, Manchester; Christopher R. Lowe, Saffron Walden, both of England

[73] Assignee: Imperial Chemical Industries Plc, London, England

[21] Appl. No.: 73,315

[22] Filed: Jul. 9, 1987

Related U.S. Application Data

[63] Continuation of Ser. No. 880,662, Jun. 30, 1986, abandoned.

[30] Foreign Application Priority Data

Jul. 15, 1985 [GB] United Kingdom ............... 8517778
May 30, 1986 [GB] United Kingdom ............... 8613201

[51] Int. Cl.$^4$ .................. A23J 1/00; B01D 15/08; C09B 44/02
[52] U.S. Cl. ................. 435/803; 152/184; 436/108; 436/111; 436/161; 436/162; 436/530; 436/541; 534/603; 534/604; 534/605; 534/606; 534/738
[58] Field of Search .......... 534/603, 604, 605, 638, 534/643, 738; 435/803; 436/108, 541, 530, 111, 161, 16; 152/184

[56] References Cited

U.S. PATENT DOCUMENTS

| | | | |
|---|---|---|---|
| 4,016,149 | 4/1977 | Travis et al. | 534/638 X |
| 4,273,707 | 6/1981 | Pedrazzi | 534/604 X |
| 4,333,874 | 6/1982 | Nickel et al. | 534/603 |
| 4,544,737 | 10/1985 | Stohr et al. | 534/603 X |
| 4,694,410 | 6/1986 | Pedrazzi | 534/604 X |
| 4,740,306 | 4/1988 | Litwack et al. | 210/198.2 |

FOREIGN PATENT DOCUMENTS

| | | | |
|---|---|---|---|
| 61-7358 | 1/1986 | Japan | 534/605 |
| 518340 | 3/1972 | Switzerland | 534/605 |
| 1045685 | 10/1986 | United Kingdom | 534/604 |

OTHER PUBLICATIONS

Gribnau, T. C. J., *Coupling of Effector-Molecules to Solid Supports*, Drukkerij van Nameren B.V.—Mijmegen, The Netherlands, 1977, pp. 22–29, 94–103, 161–181.

*Primary Examiner*—Floyd D. Higel
*Attorney, Agent, or Firm*—Cushman, Darby & Cushman

[57] ABSTRACT

A colored compound containing a cationic group and a cellulose reactive group, especially a compound of the formula:

$$A\text{—}Y\text{—}B \qquad \text{I}$$

or $$Y'\text{—}B \qquad \text{II}$$

wherein
 A is the cationic group;
 Y is a chromophore;
 Y' is a cationic chromophore
and
 B is the reactive group, which is suitable for the preparation of a protein adsorbent or precipitant for use in the separation of mixtures of proteins.

4 Claims, No Drawings

PROTEIN ADSORBENT INCLUDING A COLORED COMPOUND CONTAINING A QUATERNARY AMMONIUM ESPECIALLY AMIDINIUM OR GUANIDIMIUM CATIONIC GROUP AND A CELLULOSE REACTIVE GROUP

This is a continuation application of Ser. No. 880,662, filed June 30, 1986, now abandoned.

This specification describes an invention relating to a coloured cationic compound, and more particularly one carrying a cellulose reactive group, and to protein adsorbents and precipitants prepared from the cationic compound which are of value in the separation and purification of proteins.

It is known, for example from U.S. Pat. No. 4,016,149 and WO 7900541, that adducts of carbohydrate substrates, such as polymers and co-polymers derived from agarose, dextrose, dextrans, etc and certain commercially-available, cellulose-reactive, acid dyes have been used as adsorbents for the chromatographic separation of proteinaceous materials.

We have now discovered a new coloured compound containing a celluose reactive group which may be bound to a substrate to provide an adsorbent suitable for the separation of complex biological molecules which could not be conveniently separated by known materials.

According to the present invention there is provided a coloured compound containing a cationic group and accellulose reactive group.

The cationic group preferably contains a positively charged tetravalent nitrogen atom although, depending on the nature of the compound, the charge may be associated with the nitrogen atom or delocalised over the whole cationic group or over the whole coloured compound. The cationic group is preferably stable to changes in hydrogen ion concentration up to pH 11 and especially up to pH 9. Examples of suitable cationic groups are fully substituted ammonium groups, such as quaternary ammonium groups and ali-and ara-cyclic analogues thereof, and especially amidinium and guanidinium groups. The cationic group may be a simple group such as a tetraalkylammonium group or an unsubstituted guanidinium or amidinium group or it may carry substituents.

The cellulose reactive group, hereinafter referred to as "the reactive group", is preferably a mono- or poly-halogenoheterocycle, such as dichloropyrimidinyl, difluoropyrimidinyl, trichloropyrimidinyl, 5-chlorodifluoropyrimidinyl and 5-cyanodichloropyrimidinyl. Especially preferred reactive groups are dichlorotriazinyl and monochlorotriazinyl.

The coloured compound comprises a chromophore, preferably an azo chromophore and more especially a monoazo chromophore, preferably linked to the reactive group, which may carry or incorporate the cationic group.

The coloured compound preferably has the formula:

A—Y—B     I or

Y'—B     II wherein
A is the cationic group;
Y is chromophore;
Y' is a cationic chromophore
and
B is the reactive group.

A coloured compound has been found to be preferable to a colourless compound because the former provides a direct visual indication of the degree of reaction with the carbohydrate substrate used in the preparation of the protein precipitant or absorbent.

Preferred cationic groups are:
(i) acyclic and cyclic fully substituted ammonium groups such as,

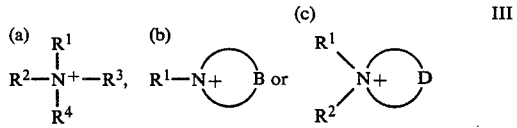

wherein $R^1$ to $R^4$ are optionally substituted alkyl, alkenyl or aryl groups, B represents an aromatic system and D represents an alicyclic system in which at least one of $R^1$ to $R^4$, B and D contains a free valency. The cationic group itself may be non-chromophoric in which case it is pendant to the chromophore, Y, or it may constitute part of a cationic chromphore, Y'. Where one or more of $R^1$ to $R^4$ is attached to a chromophore the groups shown in Formula III correspond to A—Y— in Formula I. Where two of $R^1$ to $R^4$ or B or D forms part of a chromophore, the groups shown in Formula III correspond to Y' -in Formula II.

(ii) amidinium or guanidinium groups of the formula:

wherein $R^6$ to $R^9$ are H or optionally substituted alkyl, alkenyl or aryl groups and n is 0 or 1. The cationic group itself may be non-chromophoric in which case it is pendant to the chromophore, Y, or it may constitute part of a cationic chromphore, Y'. Where the cationic group is not chromophoric it is preferably attached to the chromophore, Y, through the free valency on the —(NH)$_n$ group. Where $R^6$ and $R^7$ or $R^8$ & $R^9$ form part of a chromophore, the groups shown in Formula IV corresponds to Y' in Formula II. Where any one of $R^1$ to $R^9$ is alkyl or alkenyl this is preferably $C_{1-4}$-alkyl or $C_{1-4}$-alkenyl and especially methyl or ethyl. Where any one of $R^1$ to $R^9$ are aryl this is preferably phenyl. It is especially preferred that each of $R^1$ to $R^4$ is H or alkyl and that each of $R^6$ to $R^9$ is H.

The chromophore is preferably an azo chromophore and a preferred azo chromophore is derived from an aniline or substituted aniline diazo component and from a substituted benzene, naphthalene or pyrazolone coupling component, in which substituents are preferably selected from $C_{1-4}$-alkyl, $C_{1-4}$-alkoxy, NH$_2$, NH$_2$CO—, NH$_2$CONH—, phenyl, $C_{1-4}$-alkyl-CO—$C_{1-4}$-alkyl-CONH—, $C_{1-4}$-alkyl-CONH—, OH and halogen, especially chloro.

Examples of the group, A—Y— in Formula I are:
4(3- & 4-trimethylammoniophenylazo)-anilino,
4-(3- & 4-guanidinophenylazo)-3-methylphenylamino, 4-(3'- & 4'-amidinophenylazo)phenylamino,
4-(3- & 4-amidinophenylazo)-3-methylphenylamino,
4-(3- & 4-amidinophenylazo)-2,5-dimethylphenylamino,
4-(3- & 4-amidinophenylazo)-5-methyl-2-methoxyphenylamino,
4-(3- & 4-amidinophenylazo)-2,5-dimethoxyphenylamino,
4-(3- & 4-amidinophenylazo)-3-acetylaminoaniline,
4-(3- & 4-amidinophenylazo)-3-ureidophenylamino,
4-(3- & 4-amidinophenylazo)-6-methoxy-3-acetylaminophenylamino,
4-(3- & 4-amidinophenylazo)-N-methylphenylamino,
4-([4-guanidinophenylazo]-[acetyl]-acetylamino)-phenylamino,
4-[4-(4-trimethylammoniophenylazo)-3-methylpyrazol-5-on-1-yl]-phenylamino,
4-[4-(4-amidinophenylazo)-3-methylpyrazol-5-on-1-yl]-phenylamino and
4-[4-(4-guanidinophenylazo)-3-methylpyrazol-5-on-1-yl]-phenylamino.

Examples of suitable fully substituted ammonium groups are tetra-alkylammonium groups, such as tetramethylammonium, aryl- and aralkyl-trialkylammonium groups, such as phenyltrimethylammonium and benzyltrimethylammonium, and more especially those in which the phenyl group is part of an azo chromophore, such as 4-(3-methylphen-4-yl-azo)-phenyltrimethylammonium; alicyclic ammonium groups, such as N,N-dimethylpyrrolidinium; and mono- or polycyclic arylammonium groups, such as N-methylpyridinium and N-methylisoquinolinium, including those in which the heteroaromatic ring is part of an azo chromophore. Examples of suitable guanidinium and amidinium groups are guanidinium, amidinium and, mono- to tetra-alkyl-guanidinium and amidinium groups as shown in Formula IV above in which $R^6$ to $R^9$ are each independently H or $C_{1-4}$-alkyl, but are preferably all H. Especially preferred guanidinium and amidinium groups are aryl-guanidinium and aryl-amidinium groups, i.e. those of Formula IV above in which the $(NH)_n$ group is joined directly to an azo chromophore. Examples of such groups are 4-(3-methyl-4-[4-N,N,N'-trimethyl-guanidino-N''-phenylazo]-pyrazolin-5-on-1-yl)phenyl and 4-(4-amidinophenylazo)-2-methylphen-1-yl.

The chromphore is conveniently attached to the reactive group through a linking group, such as an amino group —NR—, preferably derived from an amino group present on one of the benzene rings of the chromophore. Alternatively the linking group may be of the formula:

—NR—X—NR— or —X—NR— wherein X is an optionally substituted bivalent hydrocarbon, e.g. optionally substituted alkylene or arylene and R is H, alkyl, preferably $C_{1-4}$-alkyl or aryl, preferably phenyl. Examples of such linking groups are alkylenediamino, such as ethylenediamino and arylenediamino, such as phenylenediamino and biphenylenediamino, aminoalkylene, such as aminoethylene and aminopropylene, aminoarylene, such as aminophenylene.

An especially preferred reactive group is a mono- or dichlorotriazine group of the formula:

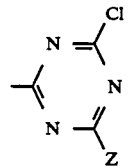

V wherein Z is Cl, a second cationic group A', or a neutral non-reactive group, T, which is conveniently attached to the heterocycle through an oxygen atom or an amino group. The second cationic group A', may be the same as A or different and is conveniently attached to the heterocycle through a linking group as hereinbefore described. Examples of suitable non-reactive groups represented by T are H, optionally substituted mono- or bi-cyclic aryl, especially phenyl, or alkyl. Examples of suitable groups represented by T—O— are optionally substituted alkoxy, such as methoxy, ethoxy, i-propoxy, butoxy and ethoxyethoxy, and optionally substituted aryloxy such as phenoxy, 4-methoxphenoxy and naphth-2-oxy. Examples of suitable groups represented by T—NR— are $NH_2$, methylamino, dimethylamino, ethylamino, 2-pyridinoethylamino, diethanolamino, anilino, 4-methylanilino, N-methylanilino, 3-, or 4-trimethylammonioanilino, piperidino and morpholino.

The compounds of Formulae I and II are conveniently prepared by reaction of a compound of the formula:

A—Y—H                VI with a polyhaloheterocyclic compound containing an active halogen atom, wherein A and Y are as hereinbefore defined and H is a hydrogen atom capable of reaction with an active halogen atom in the polyhalogenoheterocyclic compound, under conditions such that there is at least one unreacted halogen atom remaining in the product.

Examples of suitable compounds of the formula VI are
4-(3'- & 4'-trimethylammoniophenylazo)aniline chloride,
4-(3'- and 4'-guanidinophenylazo)-3-methylaniline chloride,
4-(3'- & 4'-amidinophenylazo)aniline chloride,
4-(3'-& 4'-amidinophenylazo)-3-methylaniline chloride,
4-(3'- & 4'-amidinophenylazo)-2,5-dimethylaniline chloride,
4-(3'- & 4'-amidinophenylazo)-5-methyl-2-methoxyaniline chloride,
4-(3'- & 4'-amidinophenylazo)-2,5-dimethoxyaniline chloride,
4-(3'- & 4'-amidinophenylazo)-3-acetylaminoaniline chloride,
4-(3'- & 4'-amidinophenylazo)-3-ureidoaniline chloride,
4-(3'- & 4'-amidinophenylazo)-6-methoxy-3-acetylaminoaniline chloride,
4-(3'- & 4'-amidinophenylazo)-N-methylaniline chloride,
4-([4-guanidino-phenylazo]-[aceto]-acetylamino)aniline chloride,
1-(4-trimethyl-ammonio-phenyl)-4-(4-aminophenylazo)-3-methyl-5-pyrazolone chloride,
1-(4-aminophenylazo)-4-(4-guanidinophenylazo)-3-methyl-5-pyrazolone chloride.

The compounds of Formulae I and II have especially good affinities for proteins and thus are adapted for the preparation of protein adsorbents and precipitants as hereinafter defined.

According to a second aspect of the present invention there is provided an adsorbent comprising the adduct of a substrate, which may be either a solid support or a soluble polymer, and a cationic compound of Formula I or Formula II. As examples of solid supports there may be mentioned acrylic polymers and co-polymers, silica, titania, alumina, hydroxyalkylmethacrylates, porous glass but the preferred solid supports are carbohydrate substrates. The carbohydrate substrate may be any solid carbohydrate material capable of reacting with the the reactive group in the coloured cationic compound whereby the coloured reactive compound may be covalently bonded to the carbohydrate, such as polymers and co-polymers of agarose, dextrose, dextrans and polyamides, especially polyacrylamides. An especially preferred carbohydrate is a polymer or co-polymer of agarose.

The matrix comprising a solid support to which the dye is bound may be in the form of a column for chromatographic separation purposes or may be in the form of a membrane to allow separation to be carried out in a membrane separation format.

As examples of soluble polymers which may be reacted with the coloured cationic compound there may be mentioned polyethylene glycols or dextran, the products of the reaction being used to separate protein materials in an aqueous two-phase partition process.

The adsorbents disclosed in accordance with the second aspect of the present invention may be prepared by standard techniques such as by reacting the coloured cationic compound with the carbohydrate substrate in the presence of an acid binding agent, such as an alkali metal carbonate or an alkali metal hydroxide, e.g. sodium carbonate or sodium hydroxide. Methods for the preparation of such adsorbents and chromatographic columns containing them are well documented, see for example WO 7900541 and U.S. Pat. No. 4,016,149.

As a third aspect of the invention there is provided a protein precipitant comprising an adduct of two or more molecules of the coloured cationic compound joined through a poly-functional linking group. Such an adduct can be used to precipitate a protein by aggregation, the adduct acting as a bridge between the protein molecules. The adduct can be formed by reacting two or more molecules of the coloured cationic compound with a polyfunctional linking compound containing two or more groups capable of reaction with the reactive group in the coloured cationic compound. Examples of di-functional linking compounds are alkylene diamines such as tetramathylene diamine and hexamethylenediamine which may be condensed with the coloured cationic compound. Where the reactive group is a halogenoheterocycle reaction occurs with the elimination of hydrogen halide. Examples of linking compounds with higher functionality are polyaminoalkanes such as diethylene triamine and tetraethylene pentamine which may link together more than two molecules of the coloured cationic compound.

The adsorbents and precipitants as described herein derived from the compound of the first aspect of the invention have greatly enhanced binding efficiency for certain biological molecules such as proteins and enzymes, especially proteases, and are thus especially well adapted for the separation of such species from mixtures of proteins.

Examples of enzymes and proteins to which the adsorbents and precipitants of the present invention are especially adapted for binding are trypsin, thrombin and carboxypeptidase-B. These species can therefore be readily separated from mixtures of enzyme and proteins in which they are present.

The present invention is further illustrated by the following examples in which all parts and percentages are by weight unless otherwise indicated.

EXAMPLE 1

A solution of 10.4 g of 4-aminobenzamidine dihydrochloride in 400 g of water and 35 g of a 2N solution of hydrochloric acid was cooled below 5° C. and 25 g of a 2N solution of sodium nitrite added. The solution was stirred for 15 minutes and the slight excess of nitrous acid removed by the addition of a few drops of sulphamic acid solution. To the solution were then added 6 g of 3-methylaniline, the pH raised to 4.5 by the addition of sodium acetate and the mixture stirred overnight. The resulting 4-(4 -amino-2-methylphenylazo) benzamidine hydrochloride was filtered off and dried.

A solution of 7.3 g of 4-(4 -amino-2-methylphenylazo) benzamidine hydrochloride in a mixture of 350 g of water and 350 g of acetone was added slowly to an ice cold suspension of 6.2 g of cyanuric chloride in 100 g of water, the temperature of the mixture being kept below 5° C. and the pH maintained between 6 and 7 by the addition of a 2N solution of sodium carbonate as required. To the mixture were then added 4.8 g of 4-aminophenyltrimethylammonium chloride and the whole mass was stirred for 4 hours at 30° C. whilst the pH was maintained between 6 and 7 by the addition of a 2N solution of sodium carbonate. The resulting precipitate, comprising mainly 4-(4-[4,6-dichloro-s-triazin-2-ylamino]-2-methyl-phenylazo)benzamidinium chloride together with a small proportion of 4-(4-[4-chloro-6-(4-trimethylammonioanilino)-s-triazin-2-ylamino]-2-methyl-phenylazo)benzamidinium dihydrochloride, was filtered off and dried.

EXAMPLE 2

To an ice-cold solution of 5.8 g of 4-(4'-amino-2'-methylphenylazo)benzamidinium chloride in 800 parts of water was added 3.8 g of cyanuric chloride and the pH maintained between 5 and 6 and finally raised to 7 by the addition of 20 g of 1M sodium hydroxide solution. To this solution were then added 8 g of mixed phosphate buffer (equimolar amounts of $KH_2PO_4$ and $Na_2HPO_4$), followed by 40 g of salt and the precipitate of dichlorotriazine filtered off, mixed with further 1 g of phosphate buffer to ensure stability during drying and dried in vacuo giving 4-(4-[4,6-dichloro-s-triazin-2-ylamino]-2-methyl-phenylazo)benzamidinium chloride.

EXAMPLE 3

To an ice cold solution of 3.75 g of 4-aminophenyltrimethylammonium chloride in 500 g of water were added 3.8 g of cyanuric chloride and the pH maintained at 5–6 and eventually raised to 7 by the addition of 20 g of 1M NaOH solution. To this mixture were added 5.8 g of 4-(4'-amino-2'-methylphenylazo)benzamidinium chloride and the suspension stirred at 40° C. for 3 hours, maintaining the pH at 5–6 and eventually raising to 7 by the addition of 40 g of 1M NaOH solution. To the clear solution were added 75 g of NaCl and the precipitate of 4-(4'-[4-chloro-6-(4-trimethylammonio)anilino-s-triazin-2-ylamino]-2'-methylphenylazo)benzamidinium dihydrochloride filtered off and dried at 50° C.

EXAMPLE 4

When the procedure of Example 3 was repeated using 3.2 g of N-(2-aminoethyl)pyridinium chloride in place of the 3.75 g of 4-aminophenyltrimethylammonium chloride the product obtained was 4-(4-[4-chloro-6-(2-pyridinoethylamino)-s-triazin-2-ylamino]-2'-methyl-phenylazo)benzamidinium dihydrochloride.

EXAMPLE 5

A solution of 10.4 g of 4-aminobenzamidine dihydrochloride in 200 g of water and 7.5 g of concentrated HCl was cooled below 5° C. and diazotised by the addition of 25 parts of 2M NaNO$_2$ solution until an excess of nitrous acid was shown on starch iodide paper. The solution was stirred for 10 minutes, the excess of nitrous acid destroyed by the addition of a few drops of 10% sulphamic acid solution and 5.4 g of N-methylaniline were added. Sufficient sodium acetate to raise the pH to 5 was added and the solution stirred overnight. The 60 g of NaCl were added and, after stirring for 15 minutes, the yellow precipitate of 4-(4-N-methylaminophenylazo)benzamidinium chloride was filtered off and dried at 50° C.

A portion, 7.2 g, of the 4-(4-N-methylaminophenylazo)benzamidinium chloride was dissolved in a mixture of 200 g of methanol and 200 g of water. To this solution, cooled to and maintained below 5° C., were added 4.7 g of cyanuric chloride and the pH maintained between 5 and 6 for 2 hours by the addition of 25 g of 1M NaOH solution as required. The yellow precipitate of 4-(4-[N-methyl-N-(4,6-dichloro-s-triazin-2-yl)]aminophenylazo)benzamidinium chloride was filtered off, mixed with 1g of mixed phosphate buffer and dried in vacuo.

The following Table gives further Examples of coloured cationic compounds in accordance with the first aspect of the present invention which are obtained by the procedure described in Example 4 when the 5.4 g of N-methylaniline are replaced by the equivalent weight of the amine shown in Table 1.

TABLE 1

| Example | Amine |
| --- | --- |
| 6 | 5-methyl-2-methoxyaniline |
| 7 | 3-aminoacetanilide |
| 8 | acetoacet-4-aminoanilide |
| 9 | 1-4'-aminophenyl-3-methyl-5-pyrazolone |

EXAMPLE 10

In a mixture of 200 g of methanol and 200 g of water was dissolved 3.6 g of 4-(4'-N-methylaminophenylazo)-benzamidinium chloride. To this solution was added a solution of 2.1 g of 5-cyano-2,4,6-trichloropyrimidine in 10 g of acetone and the pH maintained between 6 and 7 for 2 hours by the addition of 12 g of 1M NaOH solution as required. At the end of this time the yellow precipitate of 4-(4-[N-methyl-N-(5-cyano-4,6-dichloropyrimidin-2-yl)amino]phenylazo)benzamidinium chloride was filtered off and dried in vacuo.

EXAMPLE 11

To a mixture of 200 g of water and 7.5 g of concentrated HCl was added 11 g of 4-aminophenylguanidinium dihydrochloride. The solution was cooled below 5° C. and diazotised by the addition of 25 g of 2M NaNO$_2$ solution until an excess of nitrous acid was shown on starch-iodide paper. The solution was stirred 10 minutes and the excess of nitrous acid destroyed by the addition of a few drops of 10% sulphamic acid solution followed by the addition of 5.4 g of N-methylaniline. Sodium acetate was added to raise the pH to 5 and the solution stirred over-night after which 60 g of NaCl were added. After stirring for 15 minutes the yellow precipitate of 4-(4'-N-methylaminophenylazo)- phenylguanidinium chloride was filtered off and dried at 50° C.

A solution of 7.2 g of 4-(4'-N-methylaminophenylazo)-phenylguanidinium chloride in a mixture of 200 g of methanol and 200 g of water was cooled below 5° C. and 4.7 g of cyanuric chloride were added, the pH being maintained between 5 and 6 for 2 hours by the addition of 25 g of 1M NaCl solution as required. The yellow precipitate of 4-(4-[N-methyl-N-(4,6-dichloro-s-triazin-2-yl)]aminophenylazo)phenylguanidinium chloride was filtered off, mixed with 1 g of mixed phosphate buffer and dried in vacuo.

EXAMPLE 12

4-(4-[2,4-dichloro-s-triazin-6-ylamino]-2-methylphenyl)azobenzamidinium chloride was purified by chromatographing a solution in chloroform-methanol-acetic acid (16:4:1 by volume) on a silica column and evaporating the solution, washing with methanol, acetone, aqueous acetone and finally water. The purified material was freeze dried and had an absorption of 13,900 1. mol$^{-1}$cm$^{-1}$ at 390 nm. To a solution of 0.1 g of this material in 8 g of a 9:1 mixture of dimethylsulphoxide and water was added 4.5 g wet weight of agarose (CL-Sepharose 4B; which had previously been washed with 500 g of water, then with 100 g of a 1:1 mixture of dimethylsulphoxide and water and finally with a 9:1 mixture of dimethylsulphoxide and water), followed by 0.02 g of solid lithium hyroxide and the mixture tumbled for 5 days. At the end of this time the dyed gel was filtered off and kept moist. Measurements of absorbance at 390 nm showed the agarose to contain 1.2 micromoles of bound dye per gram of moist gel weight. Columns measuring 8 mm by 20 mm were packed with 1 g of this gel and equilibrated by washing with either sodium acetate buffer solution (buffer A) having a pH value of 4, or 3-(N-morpholino)propanesulphonic acid buffer solution (buffer B), having a pH value of 7. The buffer used is indicated in Table 2 below.

A volume of between 20 and 150 mg containing the appropriate units of enzyme activity (trypsin, 1400; chymotrypsin, 4.24; carboxypeptidase-B, 1.36; thrombin, 24; lactate dehydrogenase, 1.2; and albumin, 0.42 A$_{280}$ units), buffered with the previously used equilibrating buffer, was applied to a column. Non-adsorbed protein was washed off the column with between 5 g and 7 g of the equilibrating buffer and elution of adsorbed protein subsequently effected by elution with a linear gradient of potassium chloride, increasing from 0 to 1M over 10 g of eluant. Fractions of 1 g were collected at a flow rate of 24 g/hour and assayed for enzyme activity. The results are displayed in Table 2.

TABLE 2

| Protein (source) | Buffer | Non-adsorbed protein | Bound protein | Bound protein subsequently eluted with: |
|---|---|---|---|---|
| Albumin (Human serum) | B | 81 | 0 | |
| Lactate dehydrogenase (Rabbit muscle) | A | 65 | 0 | |
| Chymotrypsin (Bovine pancreas) | B | 100 | 0 | |
| Trypsin (Bovine pancreas) | A | 0 | 71 | glycine/HCl buffer (50 mM, pH 2.1) |
| Carboxypeptidase-B (Porcine pancreas) | A* | 0 | 70 | zinc-free buffer |
| Thrombin (Human plasma) | B | 0 | 87 | 0.3 M KCl |

*In this example, 1 mM zinc chloride was added to the acetate buffer used.

EXAMPLE 13

A suspension of lg of bovine pancreas acetone powder in 10 g 0.1M acetate buffer, having a pH of 4, was tumbled overnight at 4° C., centrifuged for 1 minute at 2500 rpm and the supernatant filtered through a microporous cellulose prefilter. To the supernatant was added 1mg of trypsin. The pH was adjusted to 7.9 with 0.5M tris/HCl buffer and calcium chloride added to a final concentration of 30 mM. After about three hours assay showed that maximum enzyme efficiencies had been reached and at this point the pH was adjusted to 5.5 with 0.1M hydrochloric acid and the solution dialysed for 6 hours at 4° C. against 0.1M acetate buffer having a pH of 5.5. The dialysed crude extract was filtered and a sample, which now contained trypsin (5600 units of activity) and chymotrypsin (140 units of activity) applied to a 12×71 mm column packed with the dye-agarose gel, prepared as described in Example A and equilibrated in 0.1M pH 5.5 acetate buffer. Non-adsorbed protein was washed off the column with 41 g of the acetate buffer, followed by 24.6 g of the same buffer containing 0.9M sodium chloride. Finally, bound trypsin was eluted from the column with 24.6 g of 50 mM glycine/HCl buffer, having a pH of 2.1. Fractions weighing 8.2 g were collected at a flow rate of 98 g/hour and assayed for trypsin and chymotrypsin activity and in the ninth fraction collected indicated an 11 fold purification of trypsin of specific activity 7400 units/mg in an overall yield of 79%.

We claim:

1. A protein adsorbent suitable for use in the chromatographic separation of complex biological molecules which comprises a colored compound having the formula:

A—Y—B or,

Y'—B wherein A is a cationic group selected from (i) an acyclic or cyclic fully substituted ammonium group of the formulae:

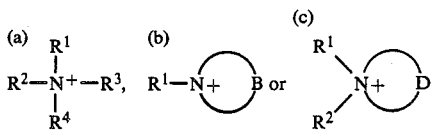

wherein $R^1$ to $R^4$ are alkyl, alkenyl or aryl groups, B represents an aromatic radical and D represents an alicyclic radial in which at least one of $R^1$ or $R^4$, B and D contains a free valency, and (ii) an amidinium or guandiinium group of the formula:

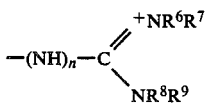

wherein $R^6$ to $R^9$ are H or alkl, alkenyl or aryl groups and n is 0 or 1; Y is a chromophore; Y' is a cationic chromophore; and B is a mono- or polyhalogenoheterocycle selected from dichloropyrimidinyl, difluoropyrimidinyl, trichloropyrimidinyl, 5-chlorodifluoropyrimidinyl, 5-cyanodichloropyrimidinyl, dichlorotriazinyl and monochlorotriazinyl bound to an inert substrate.

2. An adsorbent according to claim 1 wherein the chromophore is an azo chromophore.

3. An adsorbent according to claim 1 wherein the cationic chromophore is selected from
4-(3- & 4-trimethylammoniophenylazo)-aniline,
4-(3- & 4-guanidinophenylazo)-3-methylphenylamino,
4-(3'- & 4'-amidinophenylazo)phenylamino,
4-(3- & 4-amidinophenyl-azo)-3-methylphenylamino,
4-(3- & 4-amidinophenylazo)-2,5-dimethylphenylamino,
4-(3- & 4-amidinophenylazo)-5-methyl-2-methoxyphenylamino,
4-(3- & 4-amidinophenylazo)-2,5-dimethoxyphenylamino,
4-(3- & 4-amidinophenylazo)-3-acetylaminoaniline,
4-(3- & 4-amidinophenylazo)-3-ureidophenylamino,
4-(3- & 4-amidinophenylazo)-6-methoxy-3-acetylaminophenylamino,
4-(3- & 4-amidinophenylazo)-N-methylphenylamino,
4-([4-guanidinophenylazo]-[acetyl]-acetylamino)-phenylamino,
4-[4-(4-trimethylammoniophenylazo)-3-methylpyrazol-5-on-1-yl]-phenylamino,
4-[4-(4-amidinophenylazo)-3-methylpyrazol-5-on-1-yl]-phenylamino and
4-[4-(4-guanidinophenylazo)-3-methylpyrazol-5-on-1-yl]-phenylamino.

4. In the chromatographic separation of proteinaceous material by contacting said material with an adsorbent, the improvement which comprises using as the adsorbent, the colored compound of claim 1.

* * * * *